(12) United States Patent
Kivel et al.

(10) Patent No.: US 11,947,138 B2
(45) Date of Patent: Apr. 2, 2024

(54) BROADBAND VISIBLE REFLECTOR

(71) Applicant: 3M INNOVATIVE PROPERTIES COMPANY, St. Paul, MN (US)

(72) Inventors: Edward J. Kivel, Stillwater, MN (US); Ryan T. Fabick, Shoreview, MN (US); Timothy J. Nevitt, Red Wing, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 200 days.

(21) Appl. No.: 17/301,946

(22) Filed: Apr. 20, 2021

(65) Prior Publication Data

US 2021/0239887 A1 Aug. 5, 2021

Related U.S. Application Data

(62) Division of application No. 16/063,149, filed as application No. PCT/US2016/066160 on Dec. 12, 2016, now Pat. No. 11,029,455.

(60) Provisional application No. 62/269,376, filed on Dec. 18, 2015.

(51) Int. Cl.
*G02B 5/08* (2006.01)
*G02B 5/28* (2006.01)

(52) U.S. Cl.
CPC ......... *G02B 5/0841* (2013.01); *G02B 5/287* (2013.01)

(58) Field of Classification Search
CPC ..... G02B 5/0841; G02B 5/287; G02B 6/0055
See application file for complete search history.

(56) References Cited

U.S. PATENT DOCUMENTS

| | | |
|---|---|---|
| 3,610,729 A | 10/1971 | Rogers |
| 4,446,305 A | 5/1984 | Rogers |
| 4,540,623 A | 9/1985 | Im |
| 5,103,337 A | 4/1992 | Schrenk |
| 5,301,069 A | 4/1994 | Wood et al. |
| 5,360,659 A | 11/1994 | Arends |
| 5,448,404 A | 9/1995 | Schrenk |
| 5,882,774 A | 3/1999 | Jonza |
| 6,157,490 A | 12/2000 | Wheatley |
| 6,368,699 B1 | 4/2002 | Gilbert |
| 6,449,089 B1 | 9/2002 | Moshrefzadeh et al. |
| 6,531,230 B1 | 3/2003 | Weber |
| 6,697,195 B2 | 2/2004 | Weber et al. |
| 6,783,349 B2 | 8/2004 | Neavin |

(Continued)

FOREIGN PATENT DOCUMENTS

| | | |
|---|---|---|
| KR | 10-1548189 | 8/2015 |
| WO | WO 1995-017303 | 6/1995 |

(Continued)

OTHER PUBLICATIONS

Weber, "Giant Birefringent Optics in Multilayer Polymer Mirrors", Science, vol. 287, Mar. 2000.

(Continued)

*Primary Examiner* — Wen Huang
(74) *Attorney, Agent, or Firm* — Robert S. Moshrefzadeh

(57) ABSTRACT

Broadband visible reflectors are disclosed. In particular, broadband visible reflectors with reduced on-axis blue reflectivity are described. Broadband visible reflectors that appear yellow in reflection are described. Such broadband visible reflectors may be used in backlights and displays.

2 Claims, 7 Drawing Sheets

(56) References Cited

U.S. PATENT DOCUMENTS

| | | |
|---|---|---|
| 7,104,776 B2 | 9/2006 | Merrill |
| 7,791,687 B2 | 9/2010 | Weber |
| 8,120,730 B2 | 2/2012 | Weber |
| 9,322,967 B2 | 4/2016 | Weber et al. |
| 2004/0125450 A1 | 7/2004 | Hebrink |
| 2007/0047080 A1 | 3/2007 | Stover |
| 2007/0092728 A1 | 4/2007 | Ouderkirk et al. |
| 2011/0102891 A1 | 5/2011 | Derks |
| 2012/0206806 A1 | 8/2012 | Weber |
| 2013/0215512 A1 | 8/2013 | Coggio |
| 2013/0250405 A1* | 9/2013 | Kivel .................. G02B 5/3041 359/359 |
| 2016/0238762 A1 | 8/2016 | Nevitt et al. |

FOREIGN PATENT DOCUMENTS

| | | | |
|---|---|---|---|
| WO | WO 1999-039224 | 8/1999 | |
| WO | 2013059228 A1 | 4/2013 | |
| WO | WO-2014099367 A1 * | 6/2014 | ............. G02B 1/005 |
| WO | 2014172258 A1 | 10/2014 | |
| WO | WO 2015-048624 | 4/2015 | |

OTHER PUBLICATIONS

International Search report for PCT International Application No. PCT/US2016/066160 dated Feb. 16, 2017, 3 pages.

* cited by examiner

BROADBAND VISIBLE REFLECTOR

BACKGROUND

Polymeric multilayer optical films are formed by coextruding tens to hundreds of molten polymer layers and subsequently orienting or stretching the resulting film. These microlayers have different refractive index characteristics and sufficient thinness so that light is reflected at interfaces between adjacent microlayers. Broadband visible reflectors reflect over all or substantially all of the visible spectrum and may be useful in displays and lighting applications.

SUMMARY

In one aspect, the present description relates to a broadband visible reflector. In particular, the broadband visible reflector includes a plurality of optical repeat units, each optical repeat unit including a first birefringent polymer layer and a second polymer layer. The optical repeat units each have an optical thickness, and the optical thickness of any optical repeat unit is not less than 220 nm.

In another aspect, the present description relates to a broadband visible reflector. The broadband visible reflector includes a plurality of optical repeat units, each optical repeat unit including a first birefringent polymer layer and a second polymer layer. The broadband visible reflector transmits not less than 30% of unpolarized light at normal incidence between 380 nm and 430 nm.

In yet another aspect, the present disclosure relates to a broadband visible reflector. The broadband visible reflector appears yellow in reflection. The broadband visible reflector also provides at least 95% photopically-weighted average $R_{hemi}(\lambda)$ over the visible spectrum, determined using the CIE 1931 photopic response function.

DETAILED DESCRIPTION

Figure 1:
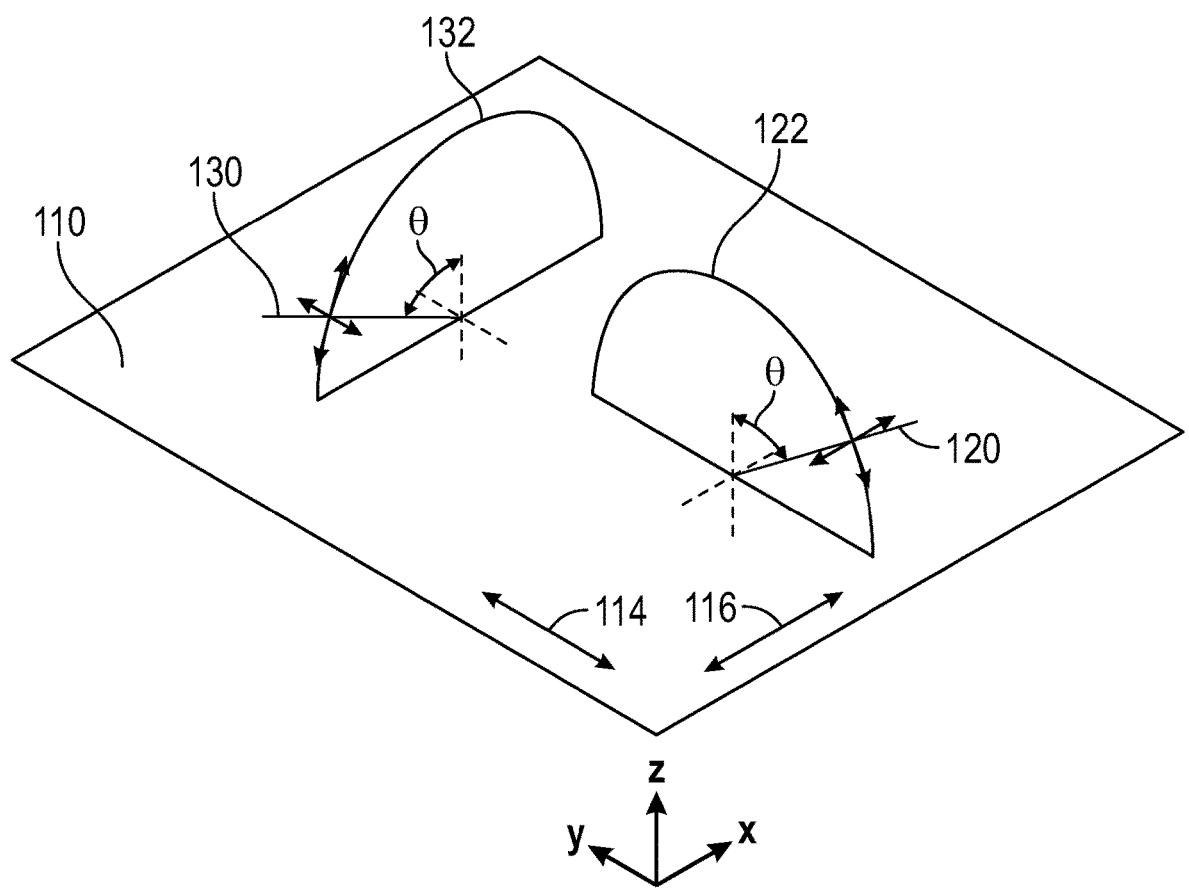
FIG. 1 is a schematic perspective view of a reflective film.

Multilayer optical films, i.e., films that provide desirable transmission and/or reflection properties at least partially by an arrangement of microlayers of differing refractive index, are known. It has been known to make such multilayer optical films by depositing a sequence of inorganic materials in optically thin layers ("microlayers") on a substrate in a vacuum chamber. Inorganic multilayer optical films are described, for example, in textbooks by H. A. Macleod, *Thin-Film Optical Filters*, 2nd Ed., Macmillan Publishing Co. (1986) and by A. Thelan, *Design of Optical Interference Filters*, McGraw-Hill, Inc. (1989).

Multilayer optical films have also been demonstrated by coextrusion of alternating polymer layers. See, e.g., U.S. Pat. No. 3,610,729 (Rogers), U.S. Pat. No. 4,446,305 (Rogers et al.), U.S. Pat. No. 4,540,623 (Im et al.), U.S. Pat. No. 5,448,404 (Schrenk et al.), and U.S. Pat. No. 5,882,774 (Jonza et al.). In these polymeric multilayer optical films, polymer materials are used predominantly or exclusively in the makeup of the individual layers. These may be referred to as thermoplastic multilayer optical films. Such films are compatible with high volume manufacturing processes and can be made in large sheets and roll goods. The description and examples below relate to thermoplastic multilayer optical films.

A multilayer optical film includes individual microlayers having different refractive index characteristics so that some light is reflected at interfaces between adjacent microlayers. The microlayers are sufficiently thin so that light reflected at a plurality of the interfaces undergoes constructive or destructive interference in order to give the multilayer optical film the desired reflective or transmissive properties. For multilayer optical films designed to reflect light at ultraviolet, visible, or near-infrared wavelengths, each microlayer generally has an optical thickness (a physical thickness multiplied by refractive index) of less than about 1 µm. Layers may be arranged generally as thinnest to thickest. In some embodiments, the arrangement of the alternating optical layers may vary substantially linearly as a function of layer count. These layer profiles may be referred to as linear layer profiles. Thicker layers may be included, such as skin layers at the outer surfaces of the multilayer optical film, or protective boundary layers (PBLs) disposed within the multilayer optical films, that separate coherent groupings (referred to herein as "packets") of microlayers. In some cases, the protective boundary layer may be the same material as at least one of the alternating layers of the multilayer optical film. In other cases, the protective boundary layer may be a different material, selected for its physical or rheological properties. The protective boundary layers may be on one side or on both sides of an optical packet. In the case of a single-packet multilayer optical film, the protective boundary layer may be on one or both external surfaces of the multilayer optical film.

Packets, for the purpose of this description, are generally monotonically varying thicknesses of optical repeat units. For example, packets may be monotonically increasing, monotonically decreasing, both increasing and constant, or both decreasing and constant, but not both increasing and decreasing. One or several layers that do not follow this pattern should be understood to be nonconsequential to the overall definition or identification of a certain optical repeat layer grouping as a packet. In some embodiments, it may be helpful to define a packet as the largest discrete grouping of consecutive, non-redundant layer pairs that collectively provides reflection over a certain subrange of the spectrum of interest (e.g., the visible spectrum).

In some cases, the microlayers have thicknesses and refractive index values providing a ¼-wave stack, i.e., arranged in optical repeat units or unit cells each having two adjacent microlayers of equal optical thickness (f-ratio=50%), such optical repeat unit being effective to reflect by constructive interference light whose wavelength λ is about twice the overall optical thickness of the optical repeat unit. Other layer arrangements, such as multilayer optical films having 2-microlayer optical repeat units whose f-ratio is different from 50%, or films whose optical repeat units include more than two microlayers, are also known. These optical repeat unit designs can be configured to reduce or to increase certain higher-order reflections. See, e.g., U.S. Pat. No. 5,360,659 (Arends et al.) and U.S. Pat. No. 5,103,337 (Schrenk et al.). Thickness gradients of the optical repeat units along a thickness axis of the film (e.g., the z-axis) can be used to provide a widened reflection band, such as a reflection band that extends over the entire human visible region and into the near infrared so that as the band shifts to shorter wavelengths at oblique incidence angles the microlayer stack continues to reflect over the entire visible spectrum. Thickness gradients tailored to sharpen band edges, i.e., the wavelength transition between high reflection and high transmission, are discussed in U.S. Pat. No. 6,157,490 (Wheatley et al.).

In many applications, the reflection properties of a film may be characterized in terms of "hemispheric reflectivity," $R_{hemi}(\lambda)$, meaning the total reflectivity of a component (whether a surface, film, or collection of films) when light (of a certain wavelength or wavelength range of interest) is incident on it from all possible directions. Thus, the component is illuminated with light incident from all directions (and all polarization states, unless otherwise specified) within a hemisphere centered about a normal direction, and all light reflected into that same hemisphere is collected. The ratio of the total flux of the reflected light to the total flux of the incident light for the wavelength range of interest yields the hemispheric reflectivity, $R_{hemi}(\lambda)$. Characterizing a reflector in terms of its $R_{hemi}(\lambda)$ may be especially convenient for backlight recycling cavities because light is often incident on the internal surfaces of the cavity—whether the front reflector, back reflector, or side reflectors—at all angles. Further, unlike the reflectivity for normal incident light, $R_{hemi}(\lambda)$ is insensitive to, and already takes into account, the variability of reflectivity with incidence angle, which may be very significant for some components within a recycling backlight (e.g., prismatic films).

It is understood that for numerous electronic display applications using backlights, and that for backlights for general and specialty lighting applications, it may be desirable for the reflector film forming the backlight's backplane to have high reflectivity characteristics. Indeed, it is further understood that the hemispheric reflectivity spectrum, $R_{hemi}(\lambda)$, strongly correlates with light output efficiency of a backlight; the higher the $R_{hemi}(\lambda)$ value across the visible light spectrum, the higher the output efficiency of the backlight. This is particularly true for recycling backlights, where other optical films may be configured over the backlight exit aperture to provide collimated or polarized light output from the backlight.

Further details of multilayer optical films and related designs and constructions are discussed in U.S. Pat. No. 5,882,774 (Jonza et al.) and U.S. Pat. No. 6,531,230 (Weber et al.), PCT Publications WO 95/17303 (Ouderkirk et al.) and WO 99/39224 (Ouderkirk et al.), and the publication entitled "Giant Birefringent Optics in Multilayer Polymer Mirrors", Science, Vol. 287, March 2000 (Weber et al.). The multilayer optical films and related articles can include additional layers and coatings selected for their optical, mechanical, and/or chemical properties. For example, a UV absorbing layer can be added at the incident side of the film to protect components from degradation caused by UV light. The multilayer optical films can be attached to mechanically reinforcing layers using a UV-curable acrylate adhesive or other suitable material. Such reinforcing layers may comprise polymers such as PET or polycarbonate, and may also include structured surfaces that provide optical function such as light diffusion or collimation, e.g. by the use of beads or prisms. Additional layers and coatings can also include scratch resistant layers, tear resistant layers, and stiffening agents. See, e.g., U.S. Pat. No. 6,368,699 (Gilbert et al.). Methods and devices for making multilayer optical films are discussed in U.S. Pat. No. 6,783,349 (Neavin et al.).

The reflective and transmissive properties of a multilayer optical film are a function of the refractive indices of the respective microlayers and the thicknesses and thickness distribution of the microlayers. Each microlayer can be characterized at least in localized positions in the film by in-plane refractive indices $n_x$, $n_y$, and a refractive index $n_z$ associated with a thickness axis of the film. These indices represent the refractive index of the subject material for light polarized along mutually orthogonal x-, y-, and z-axes, respectively. For ease of explanation in the present patent application, unless otherwise specified, the x-, y-, and z-axes are assumed to be local Cartesian coordinates applicable to any point of interest on a multilayer optical film, in which the microlayers extend parallel to the x-y plane, and wherein the x-axis is oriented within the plane of the film to maximize the magnitude of $\Delta n_x$. Hence, the magnitude of $\Delta n_y$ can be equal to or less than—but not greater than—the magnitude of $\Delta n_x$. Furthermore, the selection of which material layer to begin with in calculating the differences $\Delta n_x$, $\Delta n_y$, $\Delta n_z$ is dictated by requiring that $\Delta n_x$ be non-negative. In other words, the refractive index differences between two layers forming an interface are $\Delta n_j = n_{1j} - n_{2j}$, where j=x, y, or z and where the layer designations 1,2 are chosen so that $n_{1x} \geq n_{2x}$, i.e., $\Delta n_x \geq 0$.

In practice, the refractive indices are controlled by judicious materials selection and processing conditions. A multilayer film is made by co-extrusion of a large number, e.g. tens or hundreds of layers of two alternating polymers A, B, optionally followed by passing the multilayer extrudate through one or more layer multiplication devices, followed by casting via a film die, and then stretching or otherwise orienting the extrudate to form a final film. The resulting film is typically composed of many hundreds of individual microlayers whose thicknesses and refractive indices are tailored to provide one or more reflection bands in desired region(s) of the spectrum, such as in the visible or near infrared. To achieve high reflectivities with a reasonable number of layers, adjacent microlayers typically exhibit a difference in refractive index ($\Delta n_x$) for light polarized along the x-axis of at least 0.05. In some embodiments, materials are selected such that the difference in refractive index for light polarized along the x-axis is as high as possible after orientation. If the high reflectivity is desired for two orthogonal polarizations, then the adjacent microlayers also can be made to exhibit a difference in refractive index ($\Delta n_y$) for light polarized along the y-axis of at least 0.05.

The '774 (Jonza et al.) patent referenced above describes, among other things, how the refractive index difference ($\Delta n_z$) between adjacent microlayers for light polarized along the z-axis can be tailored to achieve desirable reflectivity properties for the p-polarization component of obliquely incident light. To maintain high reflectivity of p-polarized light at oblique angles of incidence, the z-index mismatch $\Delta n_z$ between microlayers can be controlled to be substantially less than the maximum in-plane refractive index difference $\Delta n_x$, such that $\Delta n_z \leq 0.5 * \Delta n_x$, or $\Delta n_z \leq 0.25 * \Delta n_x$. A zero or near zero magnitude z-index mismatch yields interfaces between microlayers whose reflectivity for p-polarized light is constant or near constant as a function of incidence angle. Furthermore, the z-index mismatch $\Delta n_z$ can be controlled to have the opposite polarity compared to the in-plane index difference $\Delta n_x$, i.e. $\Delta n_z < 0$. This condition yields interfaces whose reflectivity for p-polarized light increases with increasing angles of incidence, as is the case for s-polarized light.

Another design consideration discussed in '774 (Jonza et al.) relates to surface reflections at the air interfaces of the multilayer reflecting polarizer. Unless the polarizer is laminated on both sides to an existing glass component or to another existing film with clear optical adhesive, such surface reflections will reduce the transmission of light of the desired polarization in the optical system. Thus, in some cases it may be useful to add an antireflection (AR) coating to the reflecting polarizer.

Polymeric multilayer optical films as described herein may be highly reflective; for example, they may reflect more than 95% or 99% or even 99.5% of visible light, as measured at normal incidence. Visible light may be characterized as wavelengths between 400 nm and 700 nm, or in some cases between 420 nm and 700 nm. Further, polymeric multilayer optical films as described herein may be thin—in some cases, thinner than 100 μm, 85 μm, or 65 μm. In embodiments where the polymeric multilayer optical film includes a third optical packet, the film may be thinner than 165 μm.

Skin layers are sometimes added. Often this is done after layer formation but before the melt exits the film die. The multilayer melt is then cast through a film die onto a chill roll in the conventional manner for polyester films, upon which it is quenched. The cast web is then stretched in different ways to achieve birefringence in at least one of the optical layers, producing in many cases either a reflective polarizer or mirror film, as has been described in, for example, U.S. Patent Publication No. 2007/047080 A1, U.S. Patent Publication No. 2011/0102891 A1, and U.S. Pat. No. 7,104,776 (Merrill et al.).

Broadband visible reflectors have been designed to provide broad coverage of the visible spectrum, to reflect light both on axis and at an angle. For example, a broadband visible reflector may provide at least 95% photopically-weighted average $R_{hemi}(\lambda)$ over the visible spectrum, determined using the CIE 1931 photopic response function. This means designing a layer profile such that there are layer pairs with an optical thickness as low as 200 nm or even less, in order to reflect blue light on axis. These thin layers were considered necessary to providing a uniform appearance and high performance for the reflector (i.e., to ensure it remains a broadband reflector). However, for typical birefringent materials used in broadband visible reflectors, absorption is highest for these thin layers. Further, at an angle from the film, these thinnest layers either reflect ultraviolet (non-visible) light only or become transparent to the incident light and do not contribute any reflectivity to the system. Surprisingly, the benefit of eliminating or minimizing these bluest layers (by using fewer layers or by providing a sharper layer profile slope) outweighs any penalty from transmitting a portion of blue light on-axis. Layers of medium thickness, for example, green reflecting layers, shift their reflection wavelengths at an angle to cover the bluer wavelengths. Accordingly, an increase of $R_{hemi}(\lambda)$ is observed when photopically weighted over the visible wavelengths. This is particularly surprising because when examined, such a film would have a characteristic that can be described as a blue leak. A blue leak refers to the fact that blue light is transmitted through the film. In transmission, the reflector appears blue. In reflection, such a film would appear to be yellow. Despite these defects in appearance, the examples provided herein show that such films may provide superior reflection performance in a display, where on-axis reflectivity is of little relative importance compared to reflection on angle. This performance improvement is captured by an increase of $R_{hemi}(\lambda)$ photopically averaged over the visible spectrum. In some embodiments, the optical thickness of any optical repeat unit is not less than 220 nm (which corresponds to a reflected on-axis wavelength of approximately 440 nm). In some embodiments, the optical thickness of any optical repeat unit is not less than 225 nm. In some embodiments, the broadband visible reflector transmits not less than 20 percent of unpolarized light at normal incidence between 380 nm and 430 nm. In some embodiments, the broadband visible reflector transmits not less than 20 percent of unpolarized light at normal incidence between 380 nm and 450 nm. In some embodiments, the broadband visible reflector transmits not less than 30, 40, or 50 percent of unpolarized light at normal incidence between 380 nm and 410 nm. These technical design criteria, viz.: minimizing or eliminated the bluest layers, may also provide comparable or superior performance to other high-performance multilayer reflectors while reducing the necessary overall thickness of the broadband visible reflector.

EXAMPLES

Measurement and Calculation of $R_{hemi}(\lambda)$ $R_{hemi}(\lambda)$ was measured using an apparatus described in US Pat. App. Pub. No. 2013/0215512 (Coggio, et al.). A commercial six inch integrating sphere manufactured by Labsphere (Labsphere, Inc., North Sutton, NH) and having a Spectralon® reflective coating, with three mutually orthogonal ports, was used to illuminate samples and to determine hemispherical reflectance spectrum, $R_{hemi}(\lambda)$. A stabilized light source illuminated the sphere through one port. A Photo Research® PR650 spectrophotometer (available from Photo Research Inc., Chatsworth, Calif.) was used to measure the sphere internal wall radiance through a second port. The sample was placed on the third port. Calibration of the integrating sphere wall radiance was done by using a known reflectance standard (Spectralon® Reference Target SRT-99-050 available from Labsphere, Inc., North Sutton_NH) placed on the third port, and sphere-wall radiance was measured with and without the calibration standard. $R_{hemi}(\lambda)$ was measured by placing samples on the third port; sample hemispheric reflectance $R_{hemi}(\lambda)$ was obtained by taking the ratio of the sphere wall radiance with and without the sample and employing a simple integrating sphere intensity-gain algorithm.

It is expected that the equilibrium intensity distribution within the integrating sphere approximates a Lambertian distribution, meaning the probability distribution of intensity with respect to incidence angle on the sample, will fall as cosine (θ), where θ=0 is normal to the sample.

FIG. 1 is a schematic perspective view of a reflective film. FIG. 1 illustrates a light ray 130 that is incident on a reflective film 110 at an angle of incidence θ, thereby forming a plane of incidence 132. The reflective film 110 includes a first reflection axis 116 that is parallel to the x-axis, and a second reflection axis 114 that is parallel to the y-axis. The plane of incidence 132 of ray 130 is parallel to the first reflection axis 116. Ray 130 has a p-polarized component that is in the plane of incidence 132, and an s-polarized component that is orthogonal to the plane of incidence 132. The p-polarized light of ray 130 will be reflected by the reflective film with a reflectivity of $R_{pp-x}$ (the projection of the electric field of the p-polarized light of ray 130 onto the plane of reflective film 110 is parallel to the x-direction), while the s-polarized light of ray 130 is reflected by the reflective film with a reflectivity of $R_{ss-y}$ (the electric field of the s-polarized light of ray 130 is parallel to the y-direction).

Further, FIG. 1 illustrates ray 120 that is incident on the reflective film in a plane of incidence 122 that is parallel to the second reflection axis 114 of the film 110. Ray 120 has a p-polarized component that is in the plane of incidence 122, and an s-polarized component that is orthogonal to the plane of incidence 122. The p-polarized light of ray 120 will be reflected by the reflective film with a reflectivity of $R_{pp-y}$, while the s-polarized light of ray 120 is reflected by the reflective film with a reflectivity of $R_{ss-x}$. The amount of transmission and reflection of p- and s-polarized light, for any plane of incidence, will depend on the characteristics of reflective film, as is further described herein.

$R_{hemi}(\lambda)$ may be calculated from information on the layer thickness profiles of microlayers and the other layer elements of the optical film and from the refractive index values that are associated with each of the microlayers and other layers within the film. By using a 4×4 matrix-solving software application for the optical response of a multilayer film, both the reflection and transmission spectra can be calculated from the known layer thickness profile(s) and refractive index properties for the x-axis plane of incidence and for the y-axis plane of incidence and for each of p-polarized and s-polarized incident light. From this, $R_{hemi}(\lambda)$ may be calculated by use of the equations listed below:

$$R_{hemi}(\lambda) = \left(\frac{R^{x-axis}(\lambda) + R^{y-axis}(\lambda)}{2}\right) * (1/E_{norm})$$

where $$R^{x-axis}(\lambda) = \frac{1}{2}\int_0^{\pi/2} \{R_{pp-x}(\theta, \lambda) + R_{ss-x}(\theta, \lambda)\} * E(\theta)d\theta$$

$$R^{y-axis}(\lambda) = \frac{1}{2}\int_0^{\pi/2} \{R_{ss-y}(\theta, \lambda) + R_{pp-y}(\theta, \lambda)\} * E(\theta)d\theta$$

and $$E_{norm} = \int_0^{\pi/2} E(\theta)d\theta$$

where $E(\theta)$ is the intensity distribution.

Figure 2:
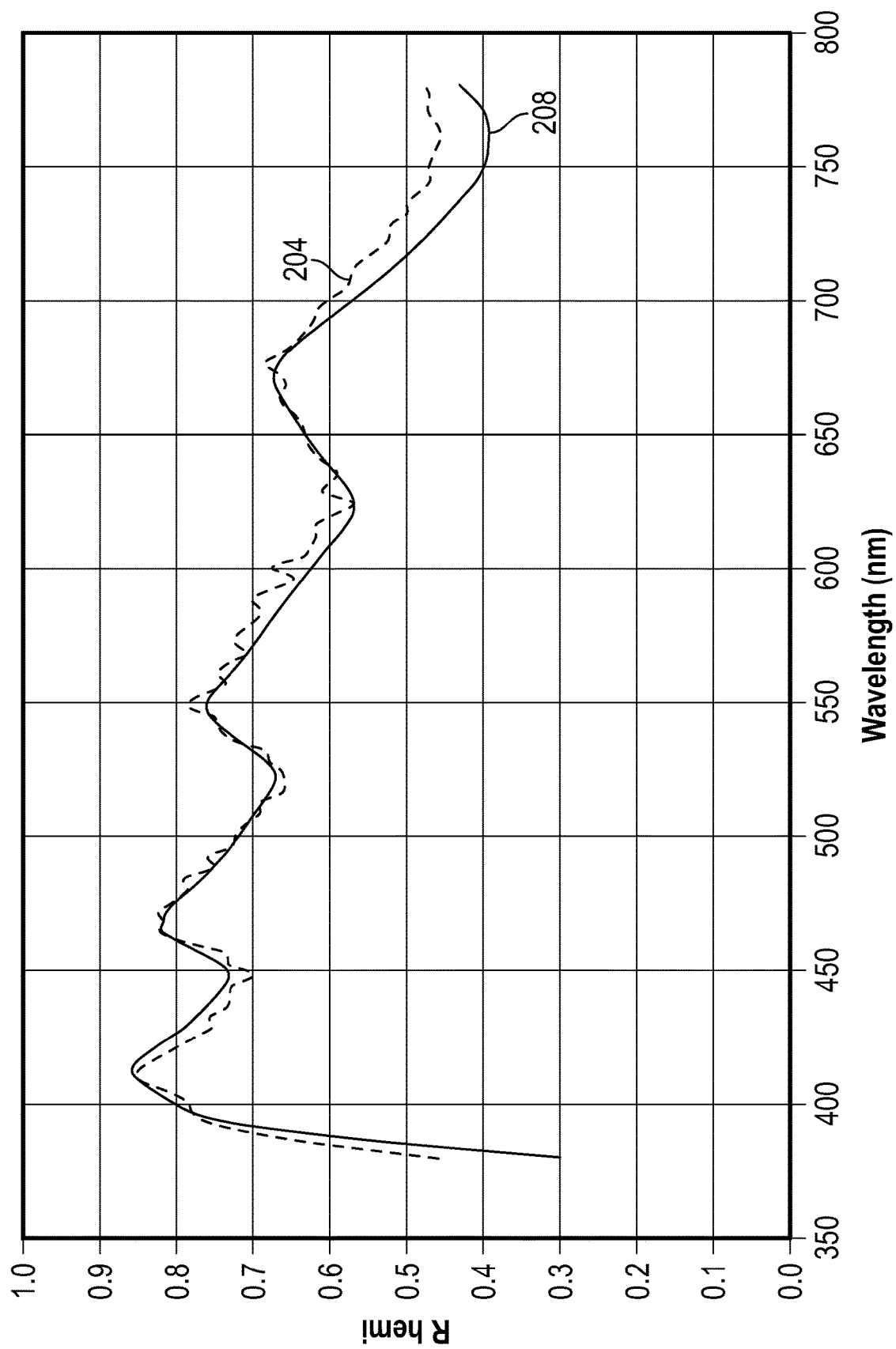
FIG. 2 is a graph showing calculated versus measured hemispheric reflectivity for a multilayer polymeric reflective film.

A multilayer polymer reflector film configured with an array of higher order harmonic visible reflection bands as generally described in U.S. Pat. No. 6,531,230 (Weber, et al.) was obtained. $R_{hemi}(\lambda)$ for the multilayer polymer reflector film was measured using the Labsphere integrating sphere as described above and the resulting spectra 208 is shown in FIG. 2. The transmission spectrum for this multilayer polymer reflector film was measured with a PerkinElmer L1050 spectrophotometer (PerkinElmer Inc., Waltham, Pa.) and $R_{hemi}(\lambda)$ was calculated using the equations (and measured spectral inputs) listed above. In this calculation, and for all further $R_{hemi}(\lambda)$ calculations, $E(\theta)$ was taken as a Lambertian intensity distribution, with a cosine($\theta$) dependence. FIG. 2 demonstrates that the calculated $R_{hemi}(\lambda)$ spectrum 204 is in good agreement with the measured $R_{hemi}(\lambda)$ spectrum 208 for the multilayer polymer reflector film. This indicated that the computational technique captured the relevant physics of reflection from a broadband visible reflector, including the effects of absorptive losses on the detailed reflection spectra.

Comparative Example C1

Figure 3:
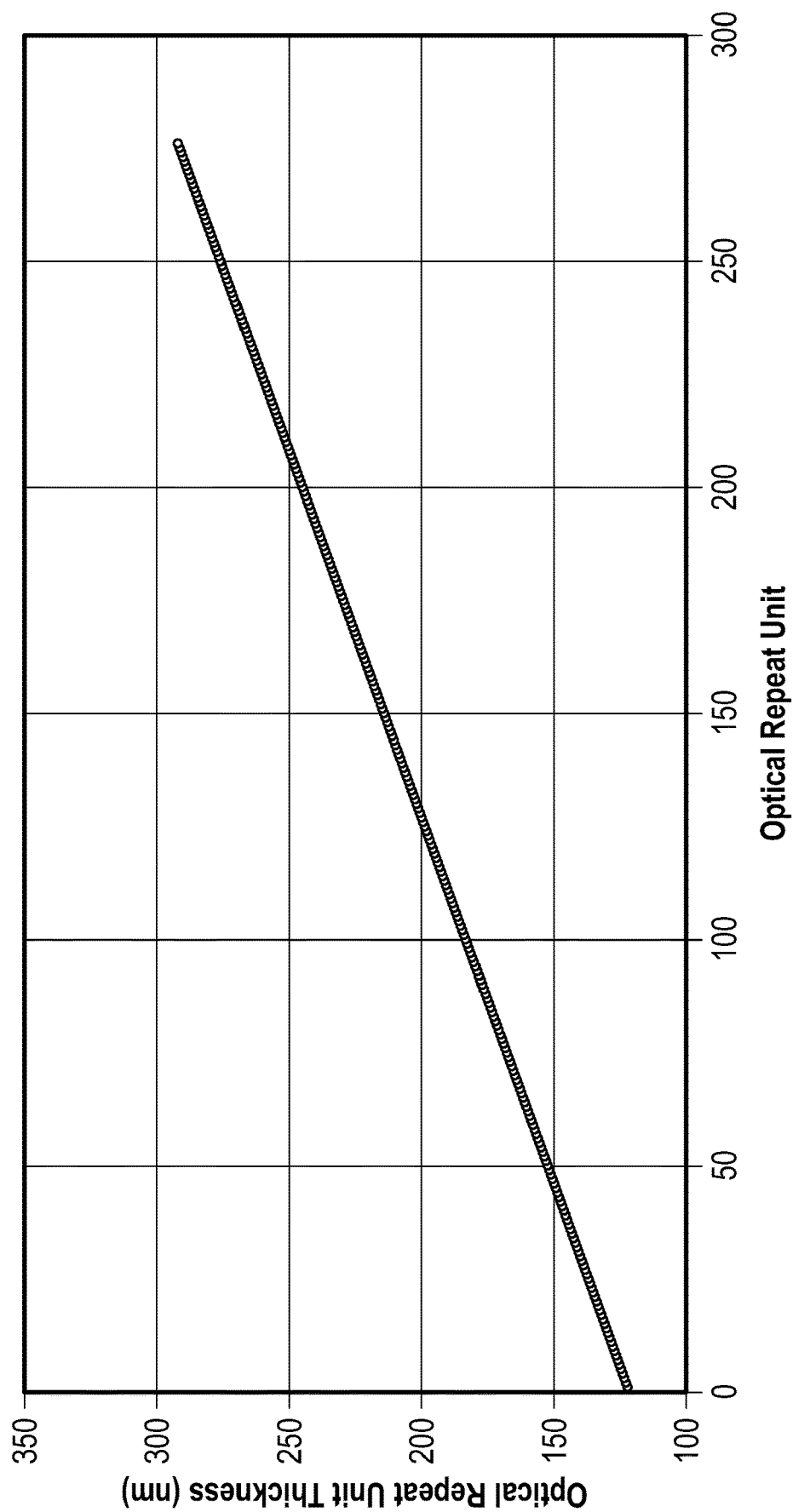
FIG. 3 is a graph showing the layer profile of the multilayer film of Comparative Example C1.

A single packet reflector with optical repeat units of PEN and PMMA was modeled with the layer profile as shown in FIG. 3. The layer profile is the total physical thickness of each optical repeat unit versus optical repeat unit number. This layer profile represents a conventional broad coverage over the visible range, both on axis and at angle. The modeled film had a total thickness of 62.1 micrometers.

A 4×4 Matrix-solving software application for the optical response of a multilayer film was used to compute reflection spectra for the film. The real ($n_x$, $n_y$, $n_z$) and imaginary ($k_x$, $k_y$, $k_z$) parts of the wavelength dependent refractive indices for PEN and PMMA that were used in the simulation are given in Table 1. In the calculation, the refractive index values were taken to vary smoothly between and beyond the values of Table 1.

TABLE 1

|  | Wavelength | 450 nm | 550 nm | 650 nm |
| --- | --- | --- | --- | --- |
| PEN | $n_x$ | 1.82 | 1.77 | 1.75 |
|  | $n_y$ | 1.82 | 1.77 | 1.75 |
|  | $n_z$ | 1.52 | 1.5 | 1.49 |
|  | $k_x$ | $6.48 \times 10^{-6}$ | $8.08 \times 10^{-6}$ | $3.38 \times 10^{-6}$ |
|  | $k_y$ | $6.48 \times 10^{-6}$ | $8.08 \times 10^{-6}$ | $3.38 \times 10^{-6}$ |
|  | $k_z$ | $6.48 \times 10^{-6}$ | $8.08 \times 10^{-6}$ | $3.38 \times 10^{-6}$ |
| PMMA | $n_x$ | 1.51 | 1.50 | 1.49 |
|  | $n_y$ | 1.51 | 1.50 | 1.49 |
|  | $n_z$ | 1.51 | 1.50 | 1.49 |
|  | $k_x$ | 0 | 0 | 0 |
|  | $k_y$ | 0 | 0 | 0 |
|  | $k_z$ | 0 | 0 | 0 |

Figure 4:
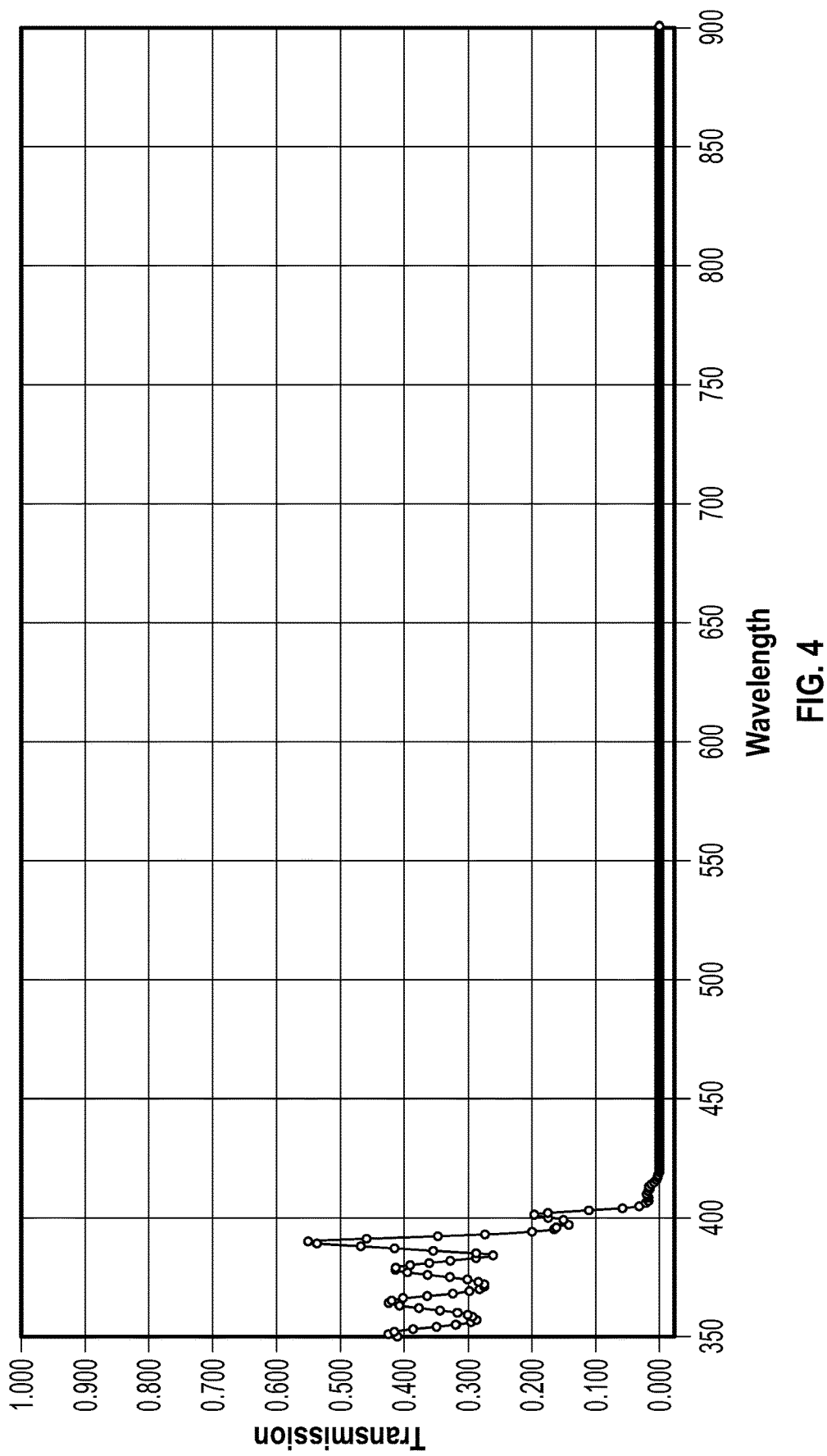
FIG. 4 is a graph showing the on-axis transmission of the multilayer film of Comparative Example C1.

The normal angle reflection and transmission spectra were calculated for light incident on the thinner optical repeat unit side. The transmission spectrum for unpolarized light at normal incidence is shown in FIG. 4. Hemispheric reflectivity was also calculated for the film. The photopically-weighted average of $R_{hemi}(\lambda)$, determined using the CIE 1931 photopic response function, was calculated to be 99.55%, giving a loss (100%−$R_{hemi}$) of 0.45%.

Example 1

Figure 5:
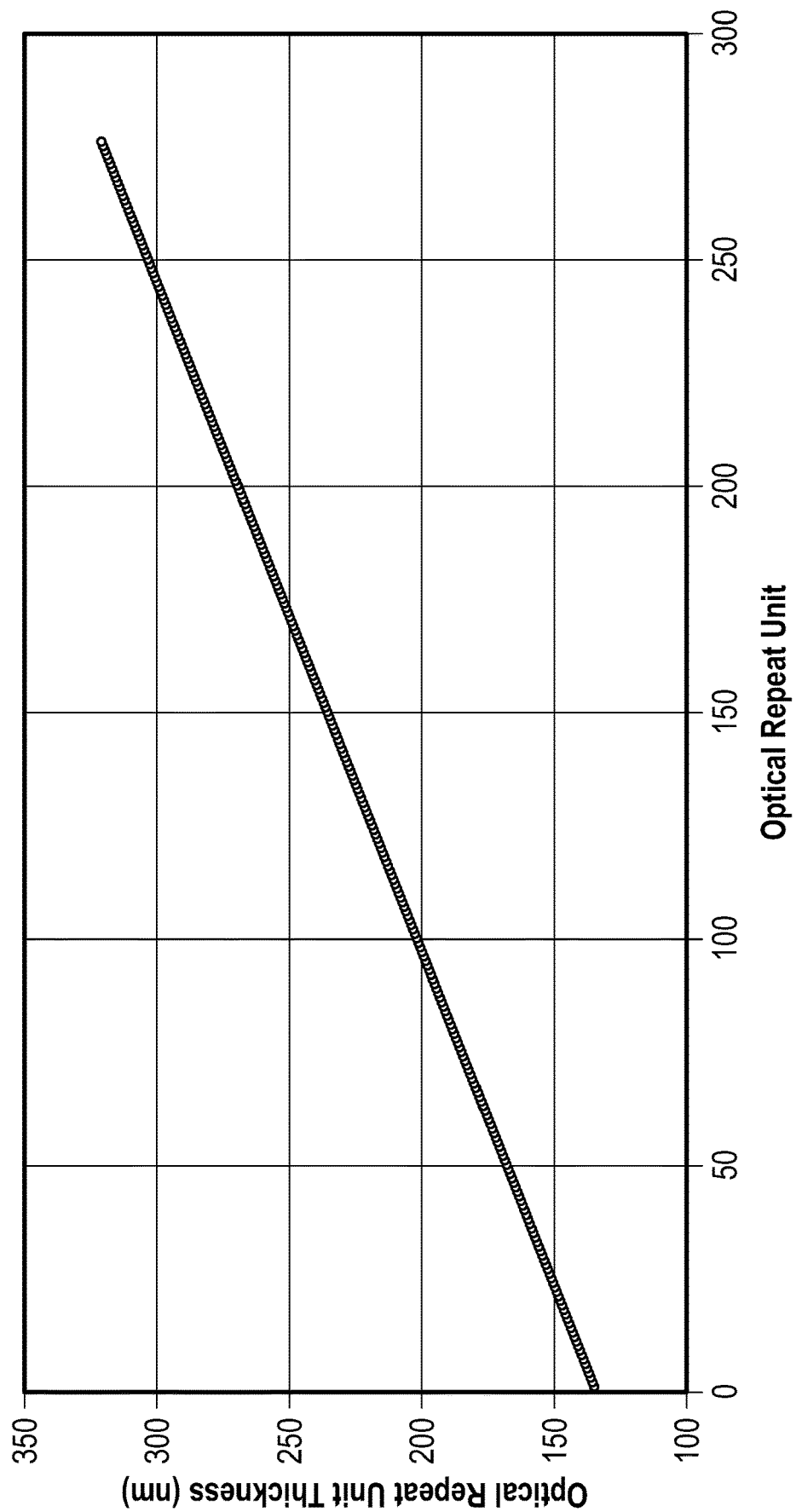
FIG. 5 is a graph showing the layer profile of the multilayer film of Example 1.

A single packet reflector was designed as and modeled using the values in Table 1 as in Comparative Example C1 except that all the optical repeat units were made 10% thicker. The layer profile showing total optical repeat unit physical thickness versus optical repeat unit number is shown in FIG. 5. The modeled film had a total thickness of 67.8 micrometers.

Figure 6:
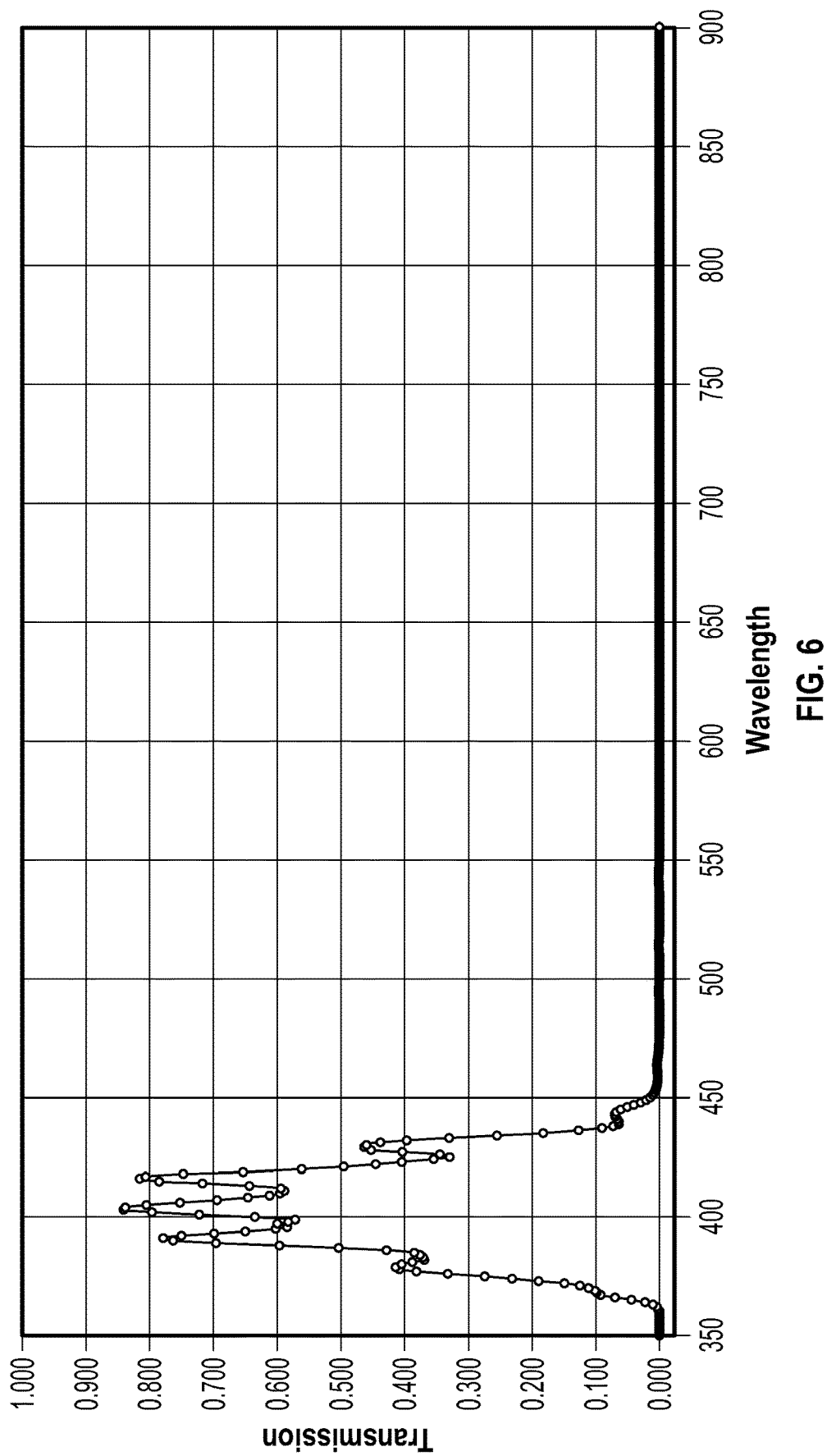
FIG. 6 is a graph showing the on-axis transmission of the multilayer film of Example 1.

The normal angle reflection and transmission spectra were calculated for light incident on the thinner optical repeat unit side. The transmission spectrum for unpolarized light at normal incidence is shown in FIG. 6. Hemispheric reflectivity was also calculated for the film. The photopically-weighted average of $R_{hemi}(\lambda)$ determined using the CIE 1931 photopic response function, was calculated to be 99.61%, giving a loss (100%−$R_{hemi}$) of 0.39%.

Figure 7:
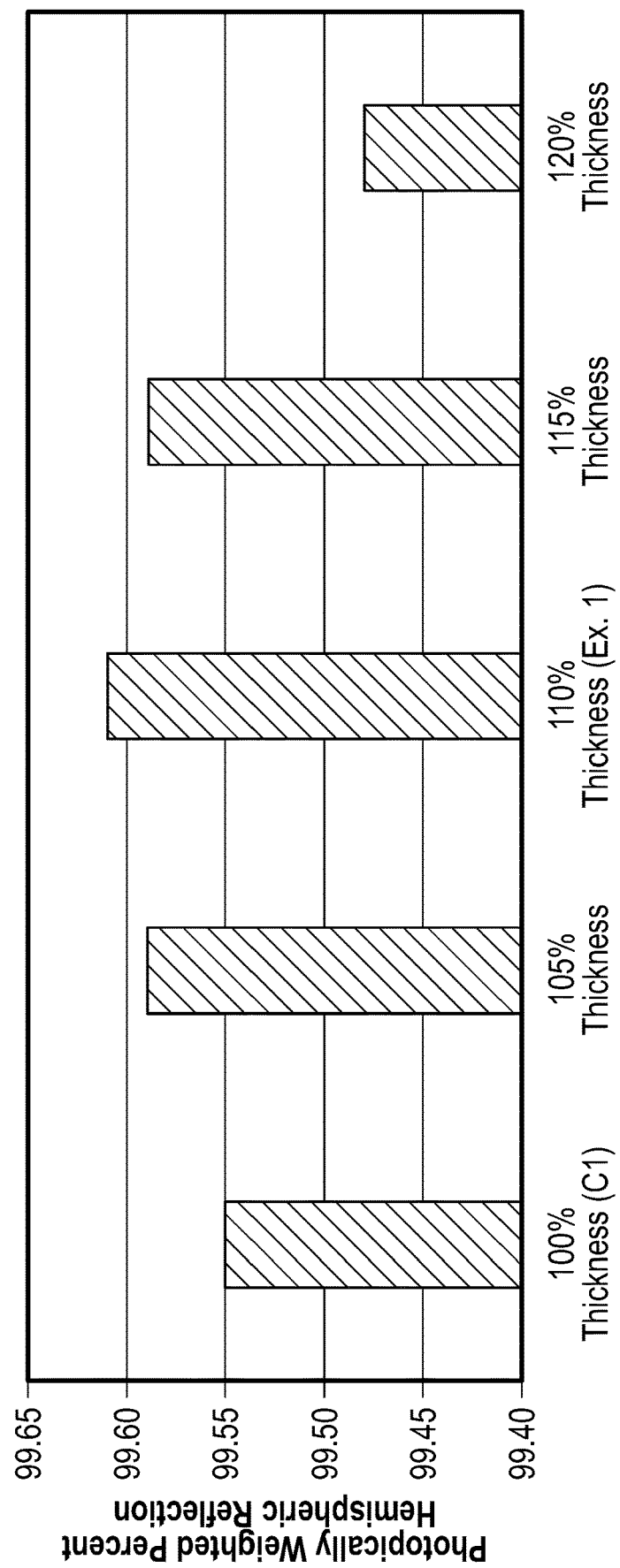
FIG. 7 is a graph showing the relationship between photopically weighted hemispheric reflection versus layer thickness, normalized to Comparative Example C1.

Additional films were designed and modeled in the same manner as Example 1, except with different adjustments to the thickness of the optical repeat units. The photopically-weighted average of $R_{hemi}(\lambda)$, determined using the CIE 1931 photopic response function, was calculated for each film. FIG. 7 shows the photopically averaged hemispheric reflection normalized to the baseline layer profile of Comparative Example C1, given as 100% thickness (corresponding to Comparative Example C1-99.55% $R_{hemi}$), 105% thickness (99.59% $R_{hemi}$), 110% thickness (corresponding to Example 1—99.61% $R_{hemi}$), 115% thickness (99.59% $R_{hemi}$), and 120% thickness (99.48% $R_{hemi}$).

The following are exemplary embodiments according to the present disclosure:

Item 1. A broadband visible reflector, comprising:
  a plurality of optical repeat units, each optical repeat unit including a first birefringent polymer layer and a second polymer layer;
  wherein the optical repeat units each have an optical thickness; and
  wherein the optical thickness of any optical repeat unit is not less than 220 nm.

Item 2. A broadband visible reflector, comprising:
  a plurality of optical repeat units, each optical repeat unit including a first birefringent polymer layer and a second polymer layer;
  wherein the broadband visible reflector transmits not less than 10% of unpolarized light at normal incidence between 380 nm and 430 nm.

Item 3. The broadband visible reflector of item 2, wherein the broadband visible reflector transmits not less than 20% of unpolarized light at normal incidence between 380 nm and 430 nm.

Item 4. The broadband visible reflector of item 2, wherein the broadband visible reflector transmits not less than 30% of unpolarized light at normal incidence between 380 nm and 430 nm.

Item 5. A broadband visible reflector, comprising:
  a plurality of optical repeat units, each optical repeat unit including a first birefringent polymer layer and a second polymer layer;
  wherein the broadband visible reflector appears yellow in reflection; and
  wherein the broadband visible reflector provides at least 95% photopically-weighted average $R_{hemi}(\lambda)$ over the visible spectrum, determined using the CIE 1931 photopic response function.

Item 6. The broadband visible reflector of item 5, wherein the broadband visible reflector appears blue in transmission.

Item 7. A method, comprising:
  providing the broadband visible reflector of item 1, 2, or 5;
  incorporating the broadband visible reflector into a backlight.

Item 8. A backlight, comprising the broadband visible reflector of item 1, 2, or 5.

Item 9. A display, comprising the broadband visible reflector of item 1, 2, or 5.

Item 10. The broadband visible reflector of item 1, 2, or 5, wherein the plurality of optical repeat units are arranged into a first packet and a second packet.

Item 11. The broadband visible reflector of item 1, 2, or 5, wherein the plurality of optical repeat units are arranged into a first packet, a second packet, and a third packet.

Item 12. The broadband visible reflector of item 1, 2, or 5, wherein the plurality of optical repeat units are arranged in a single packet.

What is claimed is:

1. A broadband visible reflector, comprising:
  a plurality of optical repeat units, each optical repeat unit including a first birefringent polymer layer and a second polymer layer;
  wherein the broadband visible reflector has a blue leak such that it transmits an average of not less than 40% of unpolarized light at normal incidence between 380 nm and 430 nm; and
  wherein the broadband visible reflector provides at least 95% photopically-weighted average $R_{hemi}(\lambda)$ over the visible spectrum, determined using the CIE 1931 photopic response function.

2. The broadband visible reflector of claim 1, wherein the broadband visible reflector transmits not less than 50% of unpolarized light at normal incidence between 380 nm and 430 nm.

* * * * *